May 23, 1972    J. S. WELLS    3,664,756

TOOL DEPTH CONTROL ADJUSTMENT

Filed Dec. 24, 1969

INVENTOR:
JOE S. WELLS, DEC'D.
BY MARY LOU WELLS, EX'X.
BY Bedell & Burgess
ATTORNEYS United States Patent Office 3,664,756
Patented May 23, 1972

3,664,756
TOOL DEPTH CONTROL ADJUSTMENT
Joe S. Wells, deceased, late of Colorado Springs, Colo., by Mary Lou Wells, executrix, 1120 Clinton Way, Colorado Springs, Colo. 80907
Filed Dec. 24, 1969, Ser. No. 887,974
Int. Cl. B23b 39/14
U.S. Cl. 408—202                                        1 Claim

ABSTRACT OF THE DISCLOSURE

Axial adjustment means for a tool, particularly for controlling the depth of a cutting tool having a cylindrical bore for rotatable mounting on a pilot, comprising an outwardly threaded surface on the tool adjacent one end thereof, the end portion of the tool bore being outwardly annularly tapered, a cylindrical sleeve slidably received in the bore, a compressible ferrule surrounding said sleeve and having one end portion nested in the tapered end portion of the bore, an internally threaded collar having an inwardly tapered end portion, the collar being screwed on the outwardly threaded end portion of the tool around the ferrule to releasably compress the ferrule in frictional locking engagement with the sleeve and a bolt threadably passing through the sleeve with its inner end engageable with the end of the pilot whereby initial approximate adjustments are made rapidly by sliding the tool axially of the sleeve and locking the sleeve by means of the collar and fine adjustments are made thereafter by rotation of the adjusting bolt.

BACKGROUND OF THE INVENTION

Field of the invention

The invention relates to machine elements and consists particularly in means for adjusting rapidly and accurately the axial position of a valve tool or similar device with respect to a mounting shaft or pilot.

Prior art

Prior to my invention, axial adjustments for devices such as valve tools with respect to the pilots on which they are rotatably mounted for the purpose of limiting the depth of their cut comprised a bolt threadably received in the bore of the tool with its inner end engageable with the upper end of the valve grinder pilot. By this means an accurate adjustment can be made, but major adjustments are time-consuming.

SUMMARY OF THE INVENTION

The invention comprises an adjusting bolt threadably mounted in a sleeve, which is turn is slidably mounted in the bore of a valve tool or similar device and is locatable at selected axial positions therein to fix the axial position of the tool on the pilot by engagement of the bolt end with the end of the pilot, the bolt being movable axially of the sleeve to effect precise adjustments.

An object of the invention is to provide a rapid means for initial approximate axial adjustments of a tool or the like on its mounting pilot or arbor, as well as fine axial adjustments thereon.

Another object is to provide means for maintaining such axial adjustments for as many respected uses of the tool as may be desired.

A more detailed object is to provide axially sliding means for rapidly making initial approximate axial adjustment of a valve tool and screw means for making the final fine adjustment.

DESCRIPTION OF THE PREFERRED EMBODIMENT

Figure 1:
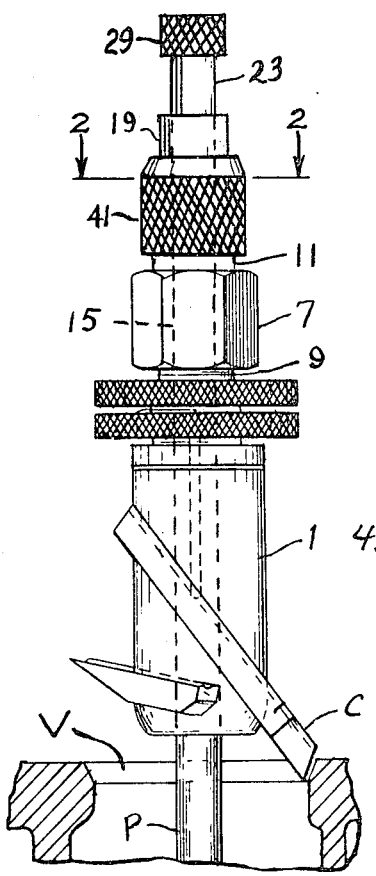
FIG. 1 is an elevational view of a valve tool embodying the invention.
Figure 3:
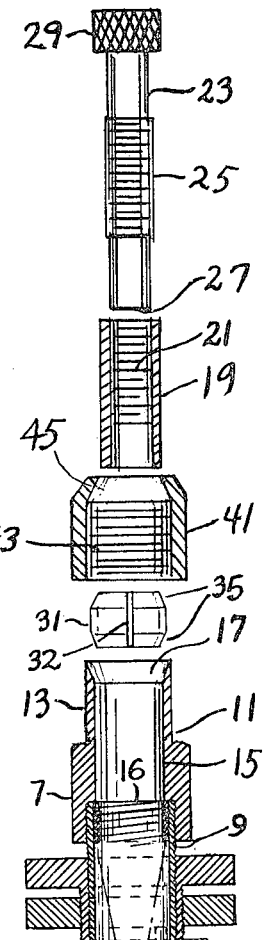
FIG. 3 is a diametral vertical sectional view along line 3—3 of FIG. 2, with the axial adjustment portion of the tool disassembled.
Figure 2:
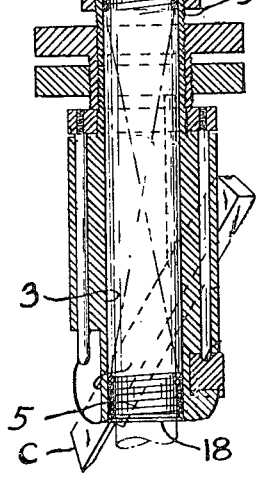
FIG. 2 is a horizontal transverse sectional view along line 2—2 of FIG. 1.
Figure 4:
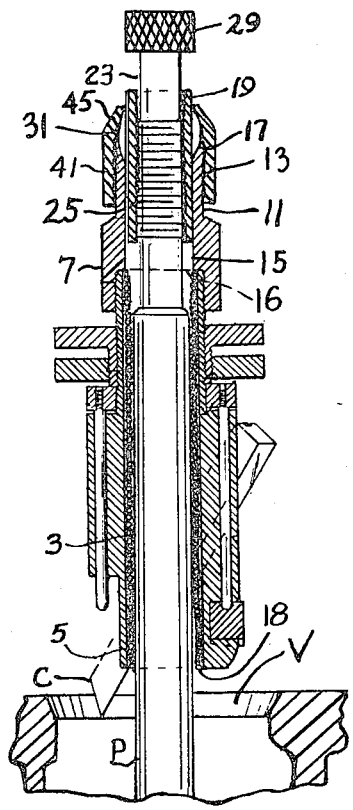
FIG. 4 is a diametral vertical sectional view along line 3—3 of FIG. 2, showing the tool assembled, but with a different vertical adjustment from FIG. 1.
Figure 5:
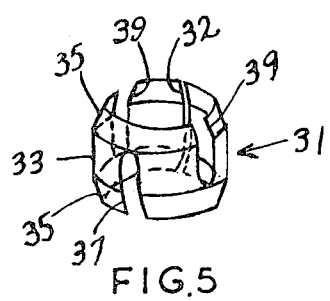
FIG. 5 is a perspective view of a ferrule which forms part of the adjustment portion of the tool.

The numeral 1 refers to the hollow cylindrical body of a valve seat narrowing tool as illustrated and described in my Pat. No. 3,443,480. Body 1 is formed with a cylindrical central axial bore 3 to permit the rotatable mounting of the tool on pilot P of a valve seat grinder. To make possible the use of the tool with pilots of various diameters, coil springs 5, of varying wire diameters such that their outside diameter fits closely within bore 3 and their inside diameter fits closely around the pilot, can be retained in bore 3 by means of cap nut 7 threadably secured to outwardly threaded body upward extension 9.

In order to provide for fast and accurate vertical adjustments of the tool which can be maintained wthout change from valve seat to valve seat, cap nut 7 is formed with an upward axial extension 11 outwardly threaded as at 13 and is provided throughout its height with a central cylindrical bore 15 the upper end of which is outwardly annularly tapered at 17.

As described more fully in my above-mentioned patent, cap nut bore 15 is of slightly less diameter than body bore 3, and thus at their juncture a shoulder 16 is formed. Shoulder 16 cooperates with a second shoulder 18 at the bottom of the body bore, to removably confine spring 5 with the body bore.

The axial adjustment portion of the tool comprises a cylindrical sleeve 19 internally threaded as at 21, and a screw 23 threaded as at 25 and threadably received in sleeve 19 with its lower end 27 projecting from the lower end of sleeve 19 and its head 29 projecting from the upper end of sleeve 19.

To provide for fast approximate vertical adjustments of the tool with respect to valve seats, sleeve 19 is slidably recevied in bore 15 of cap nut 7. For holding sleeve 19 in any selected position within bore 15, a ferrule 31 axially split at 32 surrounds sleeve 19. To facilitate compression of the collar into frictional engagement with sleeve 19 ferrule 31 is formed of thin sheet metal and has a middle section 33 of cylindrical shape with upper and lower inwardly tapered marginal portions. Diametrically opposite split 32 ferrule 31 is formed with a downwardly open vertical slot 37 which extends through cylindrical middle section 31 and terminates at the top of center section 31 and midway between slot 37 and split 32 are formed a pair of upwardly open vertical slots 39 which terminate at the top of the middle section.

The bottom tapered margin 35 of ferrule 31 is seated in outwardly flared upper end 17 of tool cap nut 13 and a locking collar 41 inwardly threaded at 43 is screwed on the outwardly threaded upward extension 11 of cap nut 7, the upper end of collar 41 being inwardly tapered as at 45 to engage the tapered upper margin 35 of ferrule 31 so that, when collar 41 is tightened on cap nut extension 11, ferrule 31 will be compressed into tight frictional engagement with sleeve 19, locking the latter against axial movement. Thus with the tool on pilot P and the bottom of screw 23 resting on pilot P, approximate vertical adjustments of the tool can be made rapidly by loosening collar 41 to release the grip of ferrule 31 on sleeve 19, sliding the tool up or down relative to sleeve 19 and pilot P until cutter C is positioned generally at the proper level with regard to valve seat V, then tightening collar 41 to compress ferrule 31 into locking frictional engagement with sleeve 19, thereby preventing further vertical movement of the tool on the pilot. A fine vertical adjustment can then be made by turning bolt 23 in sleeve 19, causing precise vertical movements of the tool with respect to the pilot, until cutter C is in the precise desired vertical relation to the valve seat. The adjustment, once made, will be maintained from seat to seat, to make each seat identical in width, height and roundness.

What is claimed is:

1. In a tool having a cutter-mounting cylindrical body threaded at one end and formed with an axial bore, means for axially adjustably mounting said tool on pilots of different sizes comprising an inward annular shoulder on said bore spaced axially thereof from the threaded end of said body, a cap nut threadably mounted on the threaded end of said body and having an externally threaded cylindrical portion extending axially away from said body, said cap nut being formed with an axial bore aligned with but of less diameter than said body bore and forming a second annular shoulder in said body bore, coil springs of different wire diameter being selectively insertible in said bore between said shoulders to accommodate pilots of different diameters, an internally threaded sleeve slidably mounted within said cap nut bore, a bolt threadably extending through said sleeve and having its inner end abuttingly engageable with the pilot and its outer end projecting from said cap nut extension, means for locking said sleeve in selected positions axially of said cap nut bore comprising an outward annular taper at the outer end of said cap nut bore, an internally threaded collar threadably mounted on said cap nut axially extending portion and defining with the outer tapered end of said cap nut bore a cavity surrounding said sleeve, and a sheet metal ferrule positioned within said cavity, said ferrule being split axially and having its ends flared inwardly for gripping engagement with said sleeve when said collar is tightened.

References Cited

UNITED STATES PATENTS

| | | | |
|---|---|---|---|
| 1,186,403 | 6/1916 | Johnsen | 77—2 R |
| 1,525,202 | 2/1925 | Rogers | 90—12.5 |
| 1,744,878 | 1/1930 | Gabel | 90—12.5 |
| 2,978,250 | 4/1961 | Abadjieff | 279—48 |
| 3,215,811 | 11/1965 | Kroy et al. | 279—48 |
| 3,443,480 | 5/1969 | Wells | 90—12.5 |

FOREIGN PATENTS

| | | |
|---|---|---|
| 19,861 | 1907 | Great Britain. |
| 1,104,295 | 4/1961 | Germany. |

GERALD A. DOST, Primary Examiner

U.S. Cl. X.R.

90—12.5